UNITED STATES PATENT OFFICE.

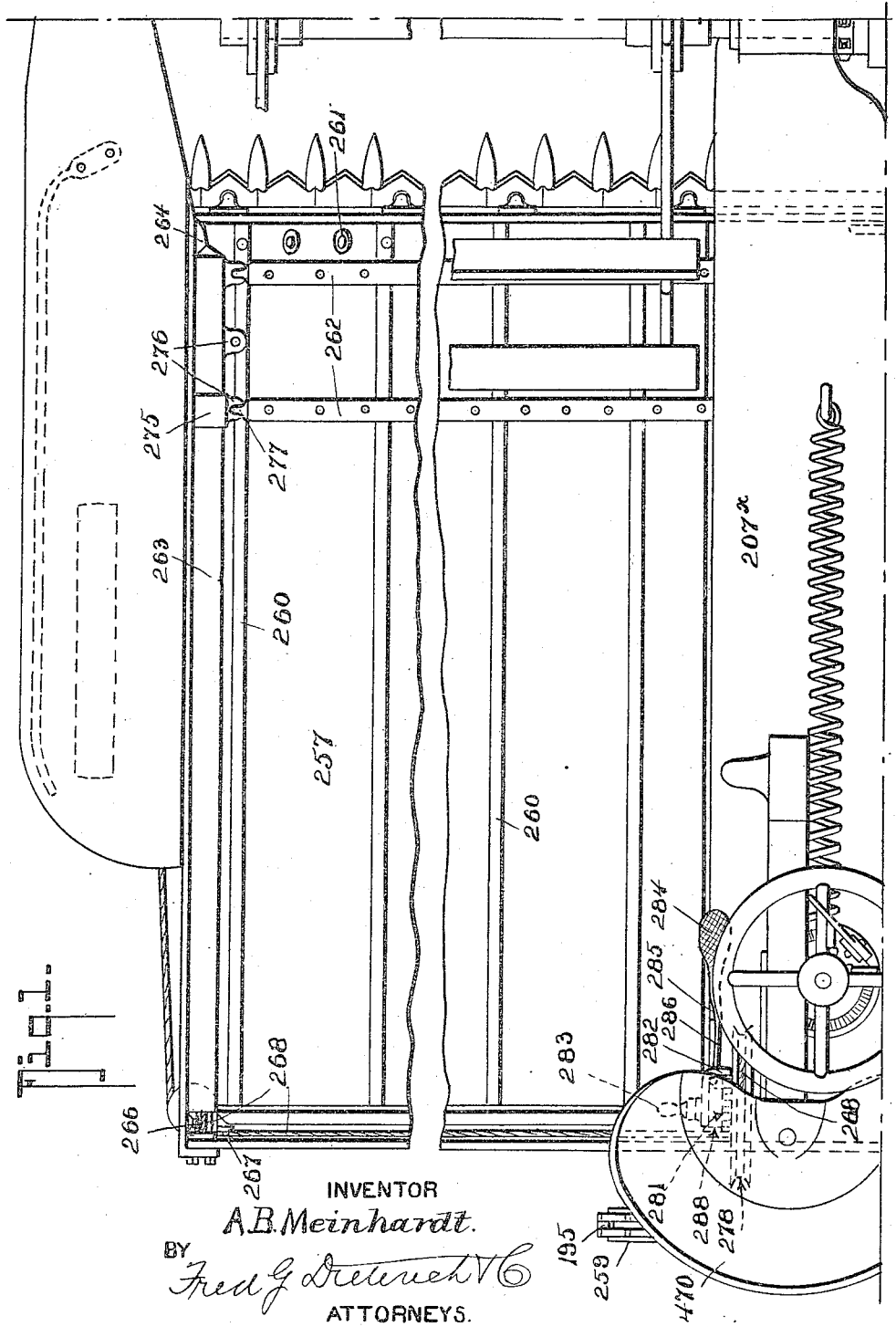

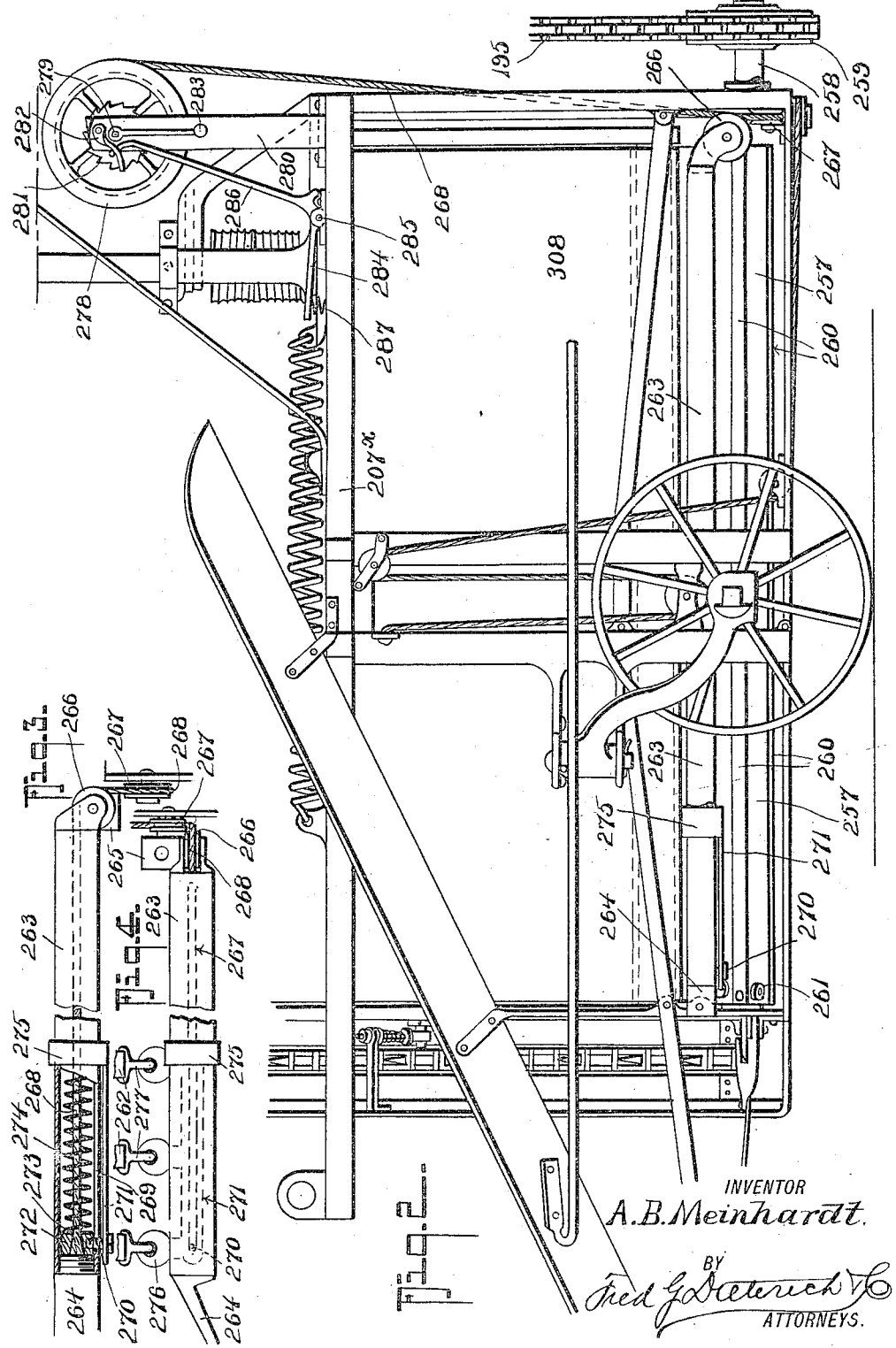

ADAM B. MEINHARDT, OF PAXICO, KANSAS.

HARVESTER.

1,224,000.  Specification of Letters Patent.  Patented Apr. 24, 1917.

Original application filed December 30, 1915, Serial No. 69,469. Divided and this application filed June 10, 1916. Serial No. 102,856.

*To all whom it may concern:*

Be it known that I, ADAM B. MEINHARDT, residing at Paxico, in the county of Wabaunsee and State of Kansas, have invented certain new and useful Improvements in Harvesters, of which the following is a specification.

My invention relates to certain new and useful improvements in harvesters and the present invention especially has for its object to provide improvements in the construction of the grain head straps and allied parts of the grain platform, and the present invention particularly has for its object to provide such improved construction as will be especially adapted for use in connection with the harvester which forms the subject-matter of my application for patent filed December 30, 1915, Serial No. 69,469 of which the present application is a divisional part.

The present invention has for its special object to provide an improved regulator or adjustment for the grain head straps whereby they can be readily and conveniently manipulated by the operator during the running of the machine, for long or short grain, the operator being thereby enabled to adjust the straps while the harvester is in full operation and thus do away with the necessity of stopping the machine in order to effect the adjustments when desired.

The invention also provides means in connection with the platform canvas, whereby the butt ends of the grain, as well as the head ends, are carried evenly onward to the elevating canvas, a thing that is of considerable benefit, and is not obtainable by any of the harvesters now in common use, with which I am at present familiar.

The invention also resides in those novel features of construction, combination and arrangement of parts, all of which will be first fully described, and then be specifically pointed out in the appended claims, reference being had to the accompanying drawings, in which:—

Figure 1 is a top plan view of a portion of a harvester, parts being removed and other parts broken away, showing the invention applied.

Fig. 2 is a side elevation of the same, parts being removed in the interest of clearness.

Fig. 3 is a detail elevation, parts being broken away, of the grain head strap regulator.

Fig. 4 is a top plan view of the parts shown in Fig. 3.

Referring now to the accompanying drawings, in which like numerals and letters of reference indicate like parts in all of the figures 257 is the platform canvas or conveyer which, in its general nature, (except as later explained) is of the usual construction, being driven through a shaft 258 and sprocket 259 from the main driving chain 195. The canvas has the usual slats 260 and in order to effect a more even conveying of the grain stalks to the elevator, I provide one or more oval knobs 261 on the canvas between the slats (see Figs. 1 and 2).

262 designates the grain head straps (see Fig. 1) of which one or more may be used, and in order to adjust the said straps for different height grain, while the machine is in operation in the field, I have invented a mechanism which is best shown in Fig. 2, by reference to which it will be noted that I provide, on the outer side of the platform 257, and in close proximity to the canvas, a pipe or tube 263, the front end of which is sustained by a bracket 264 and the rear end by a bracket 266 over which and over guide sheaves 267 on the body frame, the adjusting cable 268 passes. The pipe 263 is longitudinally slotted as at 269 to permit passage of the screw 270 that fastens the slide bar 271 to the shiftable plug 272 that operates in the pipe and to which the cable 268 is fastened at 273. The plug 272 is pushed forward by a coil spring 274 within the pipe, against the tension of which the cable 268 acts.

The slide bar 271 is also supported by a collar 275 which slides on the pipe 263 (see Figs. 3 and 4) and it has one or more ears 276 into which the grain head straps 262 are hooked as at 277.

The cable 268 runs to the operating mechanism which is located on the operator's platform 207× at the rear thereof near the operator's seat 470 so as to be conveniently within his reach. This operating mechanism comprises a grooved wheel 278 on which the cable 268 may be wound to move the grain head straps rearwardly. The wheel 278 is mounted with its spindle 279 in bearings in a standard 280 and it has a back check ratchet 281 with which the holding pawl 282 engages (see Fig. 2). The cable is wound up by turning the wheel 278 by a crank 283 and the pawl 282 is lifted to release the wheel by means of a treadle 284 having a rod 286 that engages the pawl, the treadle being pivoted at 285 (see Fig. 2) and a spring 287 being provided, if desired, to raise the treadle and maintain the normal engagement between the pawl 282 and the ratchet 281.

In practice, as the grain is cut and falls upon the platform the head portions of the grain travel faster than the butts or cut off end of the grain, the cut off end of the grain being held back by the grain which is being cut by the sickle or knife, thus giving the heads a chance to run faster than the cut off end of the grain, consequently the grain heads go up the elevating conveyer too rapidly, under ordinary conditions, which should not be, as it makes a ragged bundle or sheath. By providing the grain head straps 262 they may be drawn over to the farther end of the platform (toward the left in Fig. 1) as desired to retard the feed of the grain heads, while the knobs 261 engage the butts of the cut grain and thus tend to more positively feed the grain butts toward the elevating conveyer. By adjusting the position of the straps 62 along the canvas a uniformly even parallel feeding of the cut grain to the elevating conveyers 308 may be had. It should be adjusted to accord with the grain being cut, whether it be long grain or short grain and the adjustment may be made at the will of the driver while the machine is running over the ground and in operation.

From the foregoing description taken in connection with the accompanying drawing, it is thought the complete construction, operation and advantages of my invention will be readily understood by those skilled in the art.

What I claim is:—

1. In a harvester having a grain receiving platform and a conveyer thereon and an operator's platform; the combination with the conveyer, of grain head straps, mechanism on the grain platform for shifting said grain head straps, and means on the operator's platform for controlling said shifting mechanism.

2. In a harvester having a grain receiving platform and a conveyer thereon and an operator's platform, the combination with the conveyer, of a grain head strap and mechanism on the grain platform and operatively controlled from the operator's platform for shifting said grain head strap, said mechanism comprising a slideway along the side of the grain platform, a slide bar on said slideway, said bar having a member to which the grain head strap is attached, means continuously tending to move said slide bar in one direction, and a device on the operator's platform and connected with said slide bar for moving it in the opposite direction.

3. In a harvester having a grain receiving platform and a conveyer thereon and an operator's platform, the combination with the conveyer, of a grain head strap and mechanism on the grain platform and operatively controlled from the operator's platform for shifting said grain head strap, said mechanism comprising a slideway, a slide bar on said slideway, said bar having a member to which the grain head strap is attached, means continuously tending to move said slide bar in one direction, a device on the operator's platform and connected with said slide bar for moving it in the opposite direction, said device including means for holding the slide bar in its adjusted positions.

4. In a harvester having a grain receiving platform and a conveyer thereon and an operator's platform, the combination with the conveyer, of a grain head strap and mechanism on the grain platform and operatively controlled from the operator's platform for shifting said grain head strap, said mechanism comprising a slideway along the side of the grain platform, a slide bar on said slideway, said bar having a member to which the grain head strap is attached, a spring for moving said slide bar in one direction, and a device on the operator's platform and connected with said slide bar for moving it in the opposite direction.

5. In a harvester having a grain receiving platform and a conveyer thereon and an operator's platform, the combination with the conveyer, of a grain head strap and mechanism on the grain platform for shifting said grain head strap, said mechanism comprising a slideway along the side of the grain platform, a slide bar on said slideway, said bar having a member to which the grain head strap is attached, means continuously tending to move said slide bar in one direction, and a cable connected to the slide bar and extending to the operator's platform, a wheel on the operator's platform on which said cable is wound to move said slide bar in the opposite direction.

6. In a harvester having a grain receiving platform and a conveyer thereon and an operator's platform, the combination with the conveyer, of a grain head strap and mechanism on the grain platform and operatively controlled from the operator's platform for shifting said grain head strap, said mechanism comprising a slideway along the side of the grain platform, a slide bar on said slideway, said bar having a member to which the grain head strap is attached, means continuously tending to move said slide bar in one direction, a cable connected to the slide bar and extending to the operator's platform, a wheel on the operator's platform on which said cable is wound to move said slide bar in the opposite direction, a device for holding said wheel from turning backwardly and a device for releasing said holding device.

7. In a harvester, a grain platform and a conveyer thereon, means on the front end of the conveyer for engaging the butts of the grain, grain head straps lying across the receiving conveyer and bodily shiftable in the direction of the movement of the machine, said grain head straps adapted to receive the heads of the cut grain as it falls, and a shifting device to which said grain head straps are connected and means for operating said shifting device at will to change the location of said grain head straps with relation to the front end of the conveyer, substantially as shown and for the purposes described.

8. The combination with the grain platform, the conveyer canvas and the cutting mechanism in advance of the conveyer canvas; of knobs on the front edge of the conveyer canvas, slats on the conveyer canvas between which said knobs are located, substantially as shown and for the purposes described.

9. The combination with the grain platform, the conveyer canvas, the cutting mechanism in advance of the conveyer canvas; of grain head straps lying across the conveyer canvas, knobs on the front edge of the conveyer canvas, slats on the conveyer canvas between which said knobs are located, said slats extending in a direction at right angles to the direction of movement of the canvas and at right angles to said grain head straps, and means adjustably positioning said grain head straps toward or from said knobs, substantially as shown and for the purposes described.

ADAM B. MEINHARDT.

Copies of this patent may be obtained for five cents each, by addressing the "Commissioner of Patents, Washington, D. C."